United States Patent [19]

Brill et al.

[11] 4,034,230

[45] July 5, 1977

[54] ELECTRO-OPTICAL BAR-CODE SCANNING UNIT

[75] Inventors: Henry Brill, Flushing; Peter Yee, East Northport, both of N.Y.

[73] Assignee: Bulova Watch Company, Inc., New York, N.Y.

[22] Filed: Oct. 24, 1975

[21] Appl. No.: 625,687

[52] U.S. Cl. .................. 250/568; 235/61.11 E; 250/235
[51] Int. Cl.² .................................. G06K 7/10
[58] Field of Search .......... 250/566, 568, 570, 569, 250/237 R, 234, 235, 236; 235/61.11 E; 178/6.8; 350/6, 7

[56] References Cited

UNITED STATES PATENTS

| | | | |
|---|---|---|---|
| 3,662,181 | 5/1972 | Hercher et al. | 250/566 |
| 3,758,783 | 9/1973 | Sick et al. | 250/237 R |
| 3,806,706 | 4/1974 | Hasslinger et al. | 250/568 |
| 3,919,527 | 11/1975 | Bowen et al. | 235/61.11 E |
| 3,928,759 | 12/1975 | Sansone | 250/566 |

*Primary Examiner*—David C. Nelms

[57] ABSTRACT

An electro-optical scanning unit adapted to sense a bar-code pattern and to generate digital signals corresponding thereto. In the unit, an incandescent light source acts to illuminate a narrow slit, and a reduced image thereof is optically projected to produce a luminous scanning line in a focal plane. An oscillating scanning mechanism interposed in the projection path causes the luminous line to sweep back and forth. The focal plane lies within a window formed in a channel dimensioned to receive an item bearing a bar-code pattern and to locate this pattern so that the bars lie in parallel relation to the luminous line, whereby when the line is swept across the pattern and is reflected thereby, the resultant light pulses are directed toward a photo-detector and converted to corresponding digital signals.

8 Claims, 4 Drawing Figures

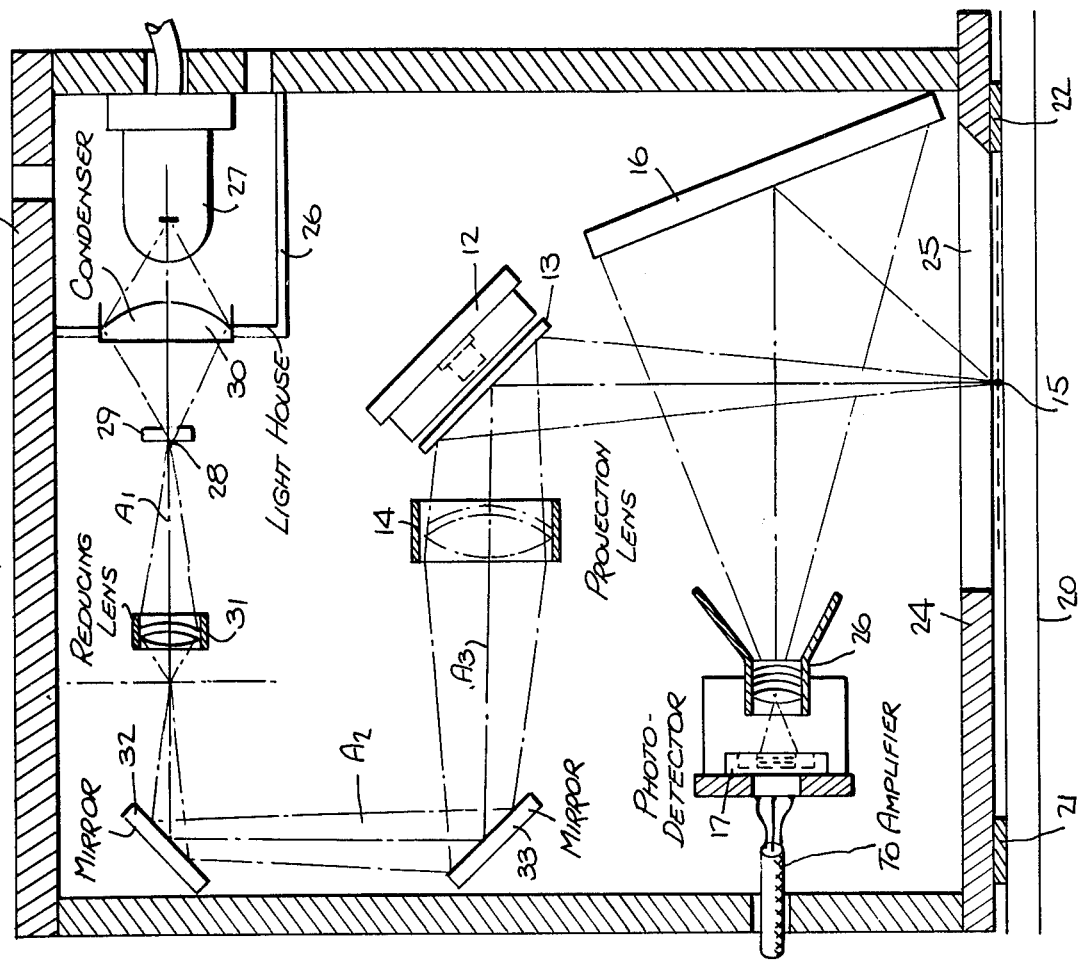
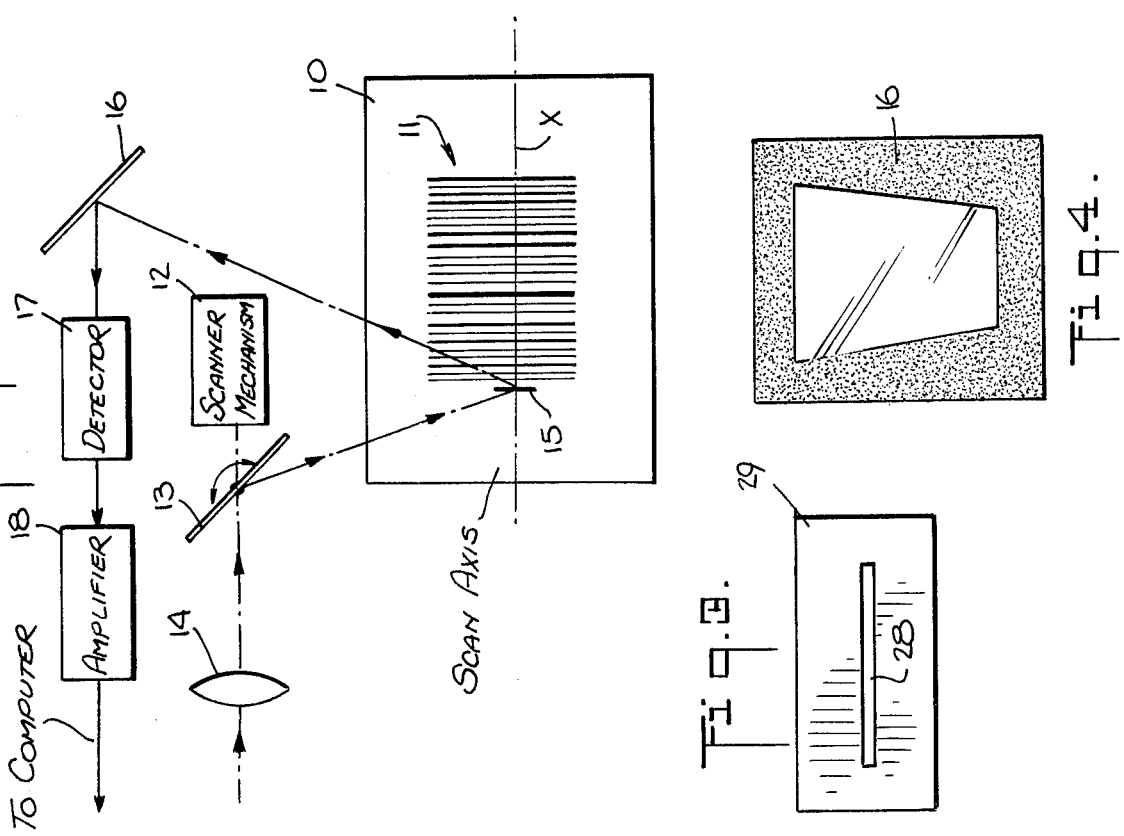

ELECTRO-OPTICAL BAR-CODE SCANNING UNIT

BACKGROUND OF INVENTION

This invention relates generally to electro-optical scanning systems adapted to sense a bar-code pattern and to generate digital signals corresponding thereto, and more particularly to a highly-compact scanning unit employing a luminous scanning line derived from an incandescent light source.

In order to facilitate the scale of packaged goods and other consumer items, for purposes of inventory control and to expedite various transactions in which it is necessary to identify the items being processed by a computer terminal, it is now the common practice to print on each item a bar code having a unique pattern. Thus every item of a particular kind bears a common symbol which distinguishes it from different items.

The typical bar code, such as the Universal Product Code (UPC), employed in a point-of-sale merchandising system to expedite supermarket checkout transactions, takes the form of a series of parallel bars whose varying widths and spacings characterize the identifying pattern.

To recover the information provided by a bar-code pattern, use is made of an electro-optical scanner. In scanners of the type heretofore known, whether in elementary form or in a more sophisticated construction, scanning is effected by means of a luminous spot derived from a light source, the spot being manually or mechanically swept across the bars of the printed code and being reflected thereby to produce modulated light pulses which are intercepted by a photodetector whose output yields digital signals corresponding to the bar code.

One simple and well-known electro-optical scanner is constituted by a two-way fiber optic wand which is manipulated by an operator to sweep a luminous spot across the bar code. The wand is coupled by a fiber optic cable to a light source and to a photodetector, whereby a beam of light from the source is transmitted by the cable to the wand and projected therefrom onto the bar code, the reflected light pulses being fed by the cable to the photodetector.

The ability of a hand-held fiber optic wand to provide a correct read-out of a bar code depends, of course, on the care exercised by the operator. But apart from the obvious limitations of a manually-operated scanner, particularly where a large volume of items is to be processed, there are other serious shortcomings in that a fiber optic wand has limited resolution and is subject to failure. With prolonged use, the repeated flexing of the fiber optic cable often results in cable rupture.

In the more complex automatic electro-optical scanner, such as that employed in a UPC merchandising system, use is made of an oscillating scanning mechanism operating in conjunction with a monochromatic, collimated laser beam. The incident beam is focussed on the bar pattern and is swept thereacross at high speed to produce, by reflection, modulated light pulses which are intercepted by a photomultiplier tube.

In a UPC system, the items bearing code indicia are advanced across a counter window without regard to the placement of the code on the item relative to the scanning beam. Hence the laser beam must be swept across the code pattern in a manner that assures a correct reading of the code irrespective of the orientation of the code pattern. This is achieved by means of oscillatory or rotating mirrors which deflect the laser beam at high velocity in the X and Y directions to intercept the bar code at any orientation.

In this situation, in order to keep the spot in focus at any point within the acceptance volume in which the bar code is presented, it is essential that the scanning beam have a large depth of focus. And for high resolution, it is essential that the diameter of the luminous scanning spot be extremely small. A laser beam fully satisfies these requirements, but in doing so it imposes certain constraints on the scanner, which are in large measure responsible for the considerable size and high cost of existing laser beam scanners.

Because the use of a laser introduces safety problems when used outside of the laboratory in an environment exposed to the public, compliance with Federal OSHA Safety Standards and the resultant need to obtain adequate bar code contrast at relatively low laser emission levels dictate an expensive photomultiplier to achieve an acceptable signal-to-noise ratio. Moreover, since a UPC arrangement calls for high-speed laser beam scanning, the digital pulses which are generated are narrow, and this in turn entails wide-band electronics in order not to degrade the signal. Such requirements further contribute to the high cost of the scanner.

Another drawback of existing types of laser-beam bar-code scanners in which the bar-code being scanned is located in a volume above the scanner window, is that the scanner is exposed to ambient light. A narrow-band, optical filter must therefore be used which is permeable to the light derived from the laser beam and discriminates against stray light energy.

Still another drawback of flying spot scanners is that while under ideal circumstances, the flying spot will intercept the bars and produce light pulses regardless of where the point of intersection is along the bars, in actual practice, since the bars are printed and may, here and there, exhibit open gaps, the point of intersection may run across a gap and miss the bar; hence the digital signals will not correspond to the bar code.

SUMMARY OF INVENTION

In view of the foregoing, it is the main object of this invention to provide an electro-optical bar-code scanning unit which is highly-compact and inexpensive and yet operates efficiently and reliably.

More specifically, it is an object of this invention to provide a unit of the above type in which the orientation of the bar code pattern on the items being scanned is fixed, and in which the scanning beam is derived from an ordinary incandescent light source and is focussed to assume a luminous line formation.

A significant feature of a scanning unit in accordance with the invention is that the luminous scanning line contains a considerably greater amount of light energy than the traditional flying spot, and the resultant modulated light pulses are of relatively high intensity, so that one is able to obtain digital signals of adequate strength by means of a low-cost photodiode light detector, thereby dispensing with the need for a photomultiplier or other expensive forms of detectors.

Another advantage of the invention resides in the fact that the flying luminous line is substantially insensitive to gaps or notches in the bars forming the code, in that there is no one point of intersection as with a flying spot, for the luminous line overlies the bars; hence accurate readings are obtainable even with poorly-printed bar codes.

Yet another object of the invention is to provide an electro-optical scanning unit including means to maintain the item being processed with its code pattern precisely oriented directly under the unit, and in which the luminous scanning line which is parallel to the code bars is swept along a single axis which is transverse to the bars. Because of the fixed location of the bar code with respect to the unit, stray light is excluded and the depth of focus can be extremely small, thereby making it possible to use an ordinary light source. By doing away with the need for a laser, one not only effects a substantial cost saving, but the need to comply with the Federal OSHA regulations is also obviated.

Briefly stated, these objects are attained in an electro-optical scanning unit in accordance with the invention wherein an incandescent light source serves to illuminate a slit and a reduced image of the illuminated slit is optically projected to produce a luminous line in a focal plane. A scanner mechanism is interposed in the optical projection path to cause said luminous line to sweep back and forth within the focal plane.

The focal plane lies within a window formed in a channel adapted to receive an item bearing a bar-code pattern and to locate this pattern so that the bars lie in parallel relation to the luminous line, whereby when the line is swept across the pattern, the resultant light pulses are directed toward a photodetector which converts the light pulses to corresponding digital signals.

For a better understanding of the invention as well as other objects and further features thereof, reference is made to the following detailed description to be read in conjunction with the accompanying drawings, wherein:

FIG. 1 shows, in schematic form, an envelope whose contents are represented by a bar code, the code being scanned by a scanning unit in accordance with the invention;

FIG. 2 schematically discloses the details of the scanning unit;

FIG. 3 is a separate view of the slitted mask included in the unit; and

FIG. 4 is a plan view of a reflecting mirror included in the scanning unit.

DESCRIPTION OF INVENTION

The Basic System

Referring now to FIG. 1, there is shown by way of illustration an envelope 10 having printed thereon a typical bar code pattern 11 composed of a series of bars of varying width and spacing, these variations characterizing the pattern and serving to identify contents of the envelope.

It will be appreciated that the scanner unit is usable with any item bearing a bar code pattern, as long as the item lends itself to placement within a confining channel associated with the unit to properly orient the code pattern with respect to a luminous scanning line.

The scanning unit includes a scanner mechanism 12 which in practice is preferably a resonant torsional oscillator of the type disclosed in the Dostal U.S. Pat. No. 3,532,408. This oscillator is adapted to swing a mirror 13 back and forth at a predetermined rate, which, in the unit in accordance with the invention, may be in the order of 3 to 8 cycles per second or higher. In practice a sweep covering two inches is usually sufficient to encompass the usual range of bar patterns.

Oscillating mirror 13 is interposed in the optical path of a projection lens 14 which serves to focus an illuminated image of a slit to create a luminous line 15 in a focal plane which contains the plane of envelope 10. It will be seen that luminous line 15 is parallel to the bars of the code-pattern; hence as the line is swept transversely thereacross, the light reflected by this pattern takes the form of light pulses determined by the width of the respective bars in the swept path and the spacing therebetween.

Since in a typical bar code, the minimum spacing between bars is 10/1000 of an inch, to resolve the bar pattern it is preferable that the width of the luminous line be less than this value (i.e., 6/1000 of an inch), so that in no circumstances does the luminous line bridge adjacent bars. However, even if the luminous line is broad enough to bridge adjacent bars, it will at any instant be largely superposed over one of the bars and the resultant useful signal will primarily represent this one bar. The minor signal component representing the other bar on which the line impinges constitutes noise and the associated circuit can be arranged to discriminate thereagainst.

The light pulses reflected by bar-code pattern 11 are intercepted by a reflector 16 and are directed thereby toward a photodetector 17 whose output pulses are applied to an amplifier 18.

It is essential that in the unit in accordance with the invention wherein the luminous line 15 is swept back and forth in the X direction only, that the item whose bar code is being scanned be oriented so that it lies in the focal plane of the scanner, with the bars of this code parallel to the luminous scanning line; otherwise, a proper read-out will not be obtained. The manner in which this is accomplished, as well as a more detailed description of the components of the unit, will now be set forth in connection with FIG. 2.

The Scanning Unit

Referring now to FIG. 2, there is shown a highly compact scanning unit enclosed in a small box 19 mounted above a counter 20 by means of a pair of spacers 21 and 22 which define a channel 23 whose dimensions are such as to accommodate envelope 10.

Bottom wall 24 of the box is provided with an open aperture or window 25 which exposes bar code 11 printed on envelope 10 to the luminous scanning line 15. The channel serves to so confine the envelope as to maintain the desired geometric relationship between the luminous scanning line and the bar code on the envelope. It will be appreciated that for other items in different physical form, the channel for receiving these items must have dimensions to snugly accommodate the item for which the unit is intended.

Mounted within a housing 26 at the right side of the box near the upper end thereof is an incandescent light bulb 27. In practice, this may be a low voltage bulb that is operated below its rated voltage in order to prolong the operating life thereof. Lamp 27 is located with its filament in register with a horizontal optical axis $A_1$, which passes through an elongated slit 28 in a masking plate 29 (shown separately in FIG. 3). The rays from lamp 27 are concentrated on the slit by means of a condenser lens 30.

A reduced image of the illuminated slit is cast by a short focus reducing lens 31 onto an inclined (45°) mirror 32 which is mounted at the left side of the box adjacent the upper end thereof. Mirror 32 acts to direct the reduced image of the illuminated slit along a vertical optical axis $A_2$ toward a reversely-inclined mirror 33 mounted at the left side of the box at about the middle thereof.

Mirror 33 serves to direct the reduced slit image along a second horizontal axis $A_3$ toward the oscillating mirror 13 through projection lens 14, which is of achromatic design. Thus mirrors 32 and 33 serve to fold the optical path between the slit and the projection lens. Oscillating mirror 13 directs the projected image toward the focal plane to create the luminous scanning line 15.

The modulated light pulses reflected by the bar pattern is intercepted by reflector 16, which is a plane mirror mounted adjacent the right side of the box near the lower end thereof. Reflector 16 directs the modulated light pulses toward a large aperture, short focal length collecting lens assembly 26, behind which is mounted the photodetector 17. In practice, lens assembly 26 is preferably an aspheric lens combined with a short focal length Fresnel lens adapted to achieve an f number that is less than f 1.

Reflector 16 is partially blackened and rendered non-reflecting, as shown in FIG. 4, to provide a wedge-shaped reflecting surface that offsets the cosine effect of the mirror with respect to the code pattern, thereby equalizing the light intensity of the reflected signals. Thus the photodetector sees that portion of the code pattern which is closest to reflector 16 with a brightness substantially equal to that portion of the pattern which is furthest away from the reflector.

Photodetector 17 preferably takes the form of a planar diffused silicon diode having a 1cm$^2$ sensitive area. It is to be understood that the unit may use other types of low-cost photodetectors. The output of photodetector 17 is applied to amplifier 18 which is a multi-stage transistorized amplifier having a selective frequency response to minimize noise.

All of the amplifier stages are capacitively coupled and include filter circuits to eliminate high and low frequency noise. A special emphasis circuit is also included to accentuate the response to shorter signals. The last stage of the amplifier is a zero-crossing detector which shapes the output to provide square wave pulses suitable for processing in an associated computer terminal.

In practice, the unit may be constructed so that all of the electronic circuits, including the drive circuit associated with the electro-mechanical scanning oscillator and the circuit for powering the lamp are incorporated in the box, the system being powered directly from line a-c current and containing all of the required transformers and regulatory circuits.

While there has been shown and described a preferred embodiment of an electro-optical bar-code scanning unit in accordance with the invention, it will be appreciated that many changes and modifications may be made therein without, however, departing from the essential spirit thereof.

Thus while the invention has been described in connection with a scanning luminous line which sweeps a stationary bar code, in practice the luminous line may be stationary while the article containing the bar code is advanced by a conveyor or other means relative to the luminous line, a consequence of which an output signal will be produced representing the bar code. Also, the luminous line scanner is not limited to sensing bar codes, for it may be used in conjunction with any surface having a varying light reflectivity to determine the character of the reflective pattern. For example, if a manufactured plate which is required to have three holes is checked by the scanner, a series of three pulses will be produced if the plate meets this specification, but if one hole is missing, this fact will be reflected in the output signal of the scanner.

We claim:

1. An electro-optical directional scanning unit adapted to sense a bar-code pattern printed on an article and to generate corresponding digital signals, said unit comprising:
   A. an incandesent light source;
   B. optical means coupled to said source to produce an illuminated slit and including a reducing lens to project a reduced scale image of said illuminated slit along an optical path to create a luminous line in a focal plane;
   C. an optical scanner interposed in said optical path to cause said luminous line to sweep back and forth periodically within said focal plane;
   D. means to confine said article at a position on which the bar-code printed thereon lies in said focal plane with its bars parallel to said luminous line whereby the light from said line is reflected to produce modulated light pulses, said confining means being constituted by a channel whose dimensions conform to that of the article and having a window therein to expose said bar code pattern; and
   E. means to detect said light pulses to generate said digital signals.

2. A unit as set forth in claim 1, wherein said scanner is constituted by an electro-mechanical torsional oscillator operatively coupled to a mirror to cause said mirror to swing back and forth.

3. A unit as set forth in claim 1, wherein said optical means includes a mask having a slit therein which is illuminated by said source.

4. A unit as set forth in claim 3, wherein said optical means which includes said reducing lens interposes said lens between said slitted mask and a first mirror which directs the reduced scale image of the illuminated slit along a first optical path toward a second mirror which in turn directs the image toward a projection lens along a second optical path at right angles to the first path, thereby folding the optical path between the slit and the projection lens.

5. A unit as set forth in claim 1, wherein light pulses are detected by a silicon diode.

6. A unit as set forth in claim 1, wherein said light source is a low-voltage lamp operating below its rated voltage.

7. A unit as set forth in claim 1, wherein said means to detect said light pulses includes a planar reflector whose reflecting surface has a wedge-shaped formation to compensate for cosine effects.

8. The directional scanning technique for sensing a bar code pattern printed on an article and formed by a series of parallel bars of varying width and spacing to produce corresponding digital signals, the technique comprising the steps of:
   A. generating a luminous line in a focal plane, said generation being effected by illuminating a slit and optically projecting a reduced scale image of the illuminated slit onto said focal plane;
   B. deflecting said line in said focal plane to sweep back and forth periodically along an axis normal to said line;
   C. confining said article so that its code pattern lies within said plane with the bars thereof parallel to the line, whereby the scanning of said code pattern by said line gives rise, by reflection, to corresponding light pulses; and
   D. converting the light pulses to digital signals.

* * * * *